Nov. 11, 1958  I. BORNSTEIN  2,859,552
VIBRATING EYES FOR EYEGLASSES, NOVELTIES AND DOLLS
Filed Dec. 10, 1957  2 Sheets-Sheet 1
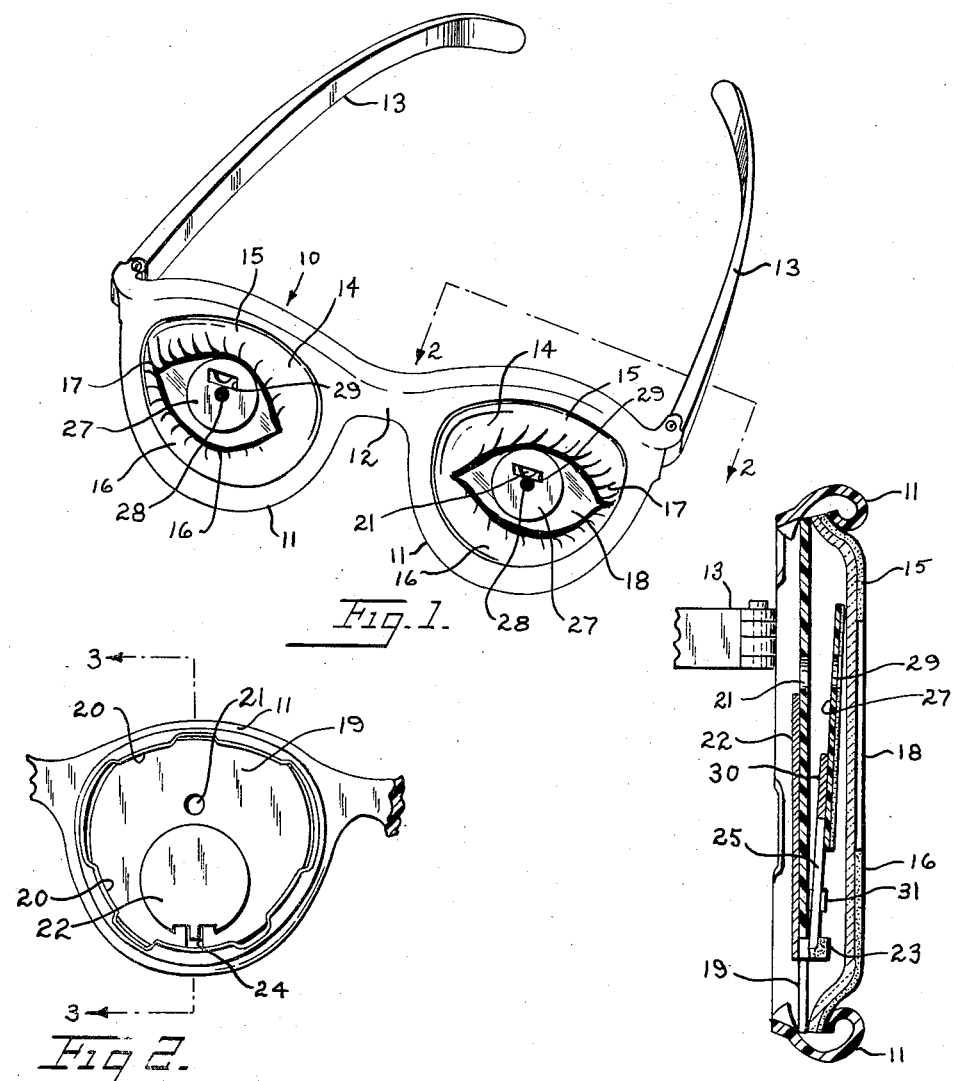
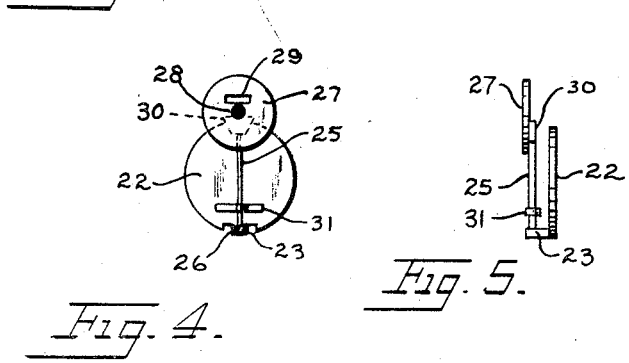
INVENTOR.
ISAAK BORNSTEIN
BY
ATTORNEY Nov. 11, 1958     I. BORNSTEIN     2,859,552
VIBRATING EYES FOR EYEGLASSES, NOVELTIES AND DOLLS
Filed Dec. 10, 1957     2 Sheets-Sheet 2

INVENTOR.
ISAAK BORNSTEIN
BY
ATTORNEY

United States Patent Office 2,859,552
Patented Nov. 11, 1958

2,859,552

VIBRATING EYES FOR EYEGLASSES, NOVELTIES, AND DOLLS

Isaak Bornstein, Bronx, N. Y.

Application December 10, 1957, Serial No. 701,921

6 Claims. (Cl. 46—1)

This invention relates to eyeglasses or spectacles and, more particularly, to a pair of toy eyeglasses or spectacles for the amusement of children.

A principal object of the present invention is to provide a pair of toy eyeglasses or spectacles having lenses with the appearance as to color, texture and anatomy quite close to the human eye.

Another object of the invention is to provide a pair of eyeglasses or spectacles with lenses having parts movable in simulation of the movement of the human eye.

Another object of the invention is to provide a pair of eyeglasses or spectacles with lenses having parts simulating eyeballs oscillating at a rapid speed so as to give a grotesque and fanciful appearance to the wearer in order to attract attention and provide amusement.

It is also proposed to provide a pair of eyeglasses or spectacles that is simple in construction, economical to manufacture and highly efficient for the purposes intended.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a pair of eyeglasses embodying the invention.

Fig. 2 is a sectional view taken on the plane of the lines 2—2 of Fig. 1 and looking in the direction of the arrows.

Fig. 3 is a vertical sectional view taken on the plane of the line 3—3 of Fig. 2, on an enlarged scale.

Fig. 4 is a front elevational view of the iris assembly.

Fig. 5 is an edge view thereof.

Figure 6:
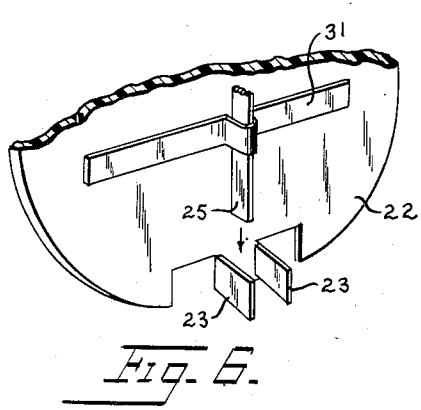
Fig. 6 is an enlarged fragmentary perspective view showing a step in the assembly of the iris assembly.
Figure 7:
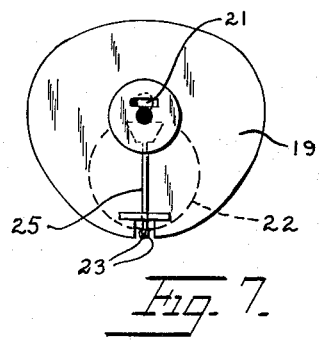
Fig. 7 is a front elevational view of the eyeball assembly.

Referring to the drawings in detail, in Fig. 1, there is shown a pair of eyeglasses or spectacles embodying the invention and designed generally at 10. The eyeglasses or spectacles comprise a light frame structure provided with open lens frames 11, 11 connected by a nose bridge 12. A pair of templets 13, 13 is hinged to the ends of the frame structure.

Figure 8:
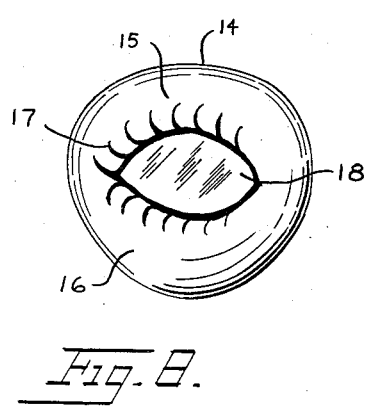
Fig. 8 is a plan view of a lens.
Figure 9:
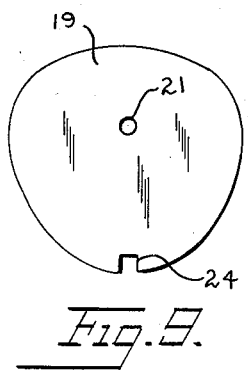
Fig. 9 is a plan view of the eyeball plate.

In accordance with the present invention, in the opening in each lens frame there is a lens 14 which may be made of glass or transparent plastic material. The lenses are slightly curved, bulging forwardly as viewed in Fig. 3 in simulation of so-called "milk-bottle glasses." Each lens is painted around the periphery thereof with a solid color such as pink to simulate human upper and lower eyelids 15 and 16, respectively, the eyelids being painted with radial lines in a black color in simulation of human eyelashes 17. The center of the lens between the eyelids is untouched and transparent as indicated at 18 (Fig. 8).

At the rear of the frame structure, the opening in each lens frame 11, 11 is closed by an opaque plate 19 of plastic preferably colored white to simulate the color of the human eyeball. The plate is removably held in position by interlocking lugs 20 spaced along the periphery of the lens frame at the rear. The center of the closure plate 19 is formed with a peephole 21 along its vertical center line but slightly above its horizontal center.

An iris assembly is interposed between each lens 14 and its closure plate 19. This assembly as shown in Figs. 4 and 5, comprises a thin metal disc 22 secured to the rear surface of the plate 19 as viewed in Fig. 1 by means of adhesive or in any other suitable manner. A pair of closely spaced lugs 23, 23 outstruck from the material of the disc 22 project from the bottom periphery of said disc and extend through a notch 24 formed in the bottom periphery of the plate 19 at its center in line with the peephole 21 to the front of the plate. A thin narrow sensitive flat metal spring 25 has one end disposed between the lugs 23, 23 and is fastened thereto by solder 26. The spring extends upwardly vertically in front of the plate 19 and is closely spaced therefrom. The vibrating spring supports a smaller thin metal disc 27 at its top end, the spring being fastened to the disc 27 at the bottom edge of the disc and centrally thereof. Disc 27 is supported in parallel relation to the closure plate 19 and is closely spaced therefrom behind the transparent portion 18 of the lens 14. The front surface of the disc 27 is preferably colored with a solid color such as blue, representing the iris of the human eye, and at its center is provided with a spot 28 of a solid contrasting color, such as black, representing the pupil of the iris of the human eye.

A slot 29 is formed in the disc 27 immediately above the spot 28. The slot is normally in register with the peephole 21 in the closure plate 19. In order to make the spring 25 more sensitive, a weight in the form of a small plate 30 is secured to the rear surface of the disc 27 preferably over the juncture between the spring and disc. A balancing device in the form of a metal strip 31 is disposed across the spring 25 and is secured thereto by bending the strip midway its ends and clamping the bent portion on the spring, but it may be secured by soldering or the like.

In use, the pair of eyeglasses 10 is worn similarly to an ordinary pair of eyeglasses. The white colored plate 19 is visible through the transparent portion 18 of each lens and gives the appearance of a human eyeball, the disc 27 and spot 28 giving the appearance of the iris and pupil of the human eye, respectively. When worn, the slightest movement of the head of the wearer, because of the sensitivity of the spring 25, will cause the disc 27 to oscillate or vibrate at a high speed giving the wearer a grotesque and fanciful appearance to the amusement of the onlooker. The wearer can see through the peephole 21 and slot 29 each time the slot moves across the peephole.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A pair of toy spectacles comprising a frame structure with lens frames at the ends thereof, templets hingedly connected to the ends of the frame structure, and lenses supported in the lens frames, said lenses each having its surface painted to simulate the eyelids of the human eye, the portion of the surface between the eyelids being transparent, and mechanism behind the transparent portions simulating human eyeballs, said mechanism behind each transparent portion including a plate colored white in simulation of the color of the human eyeball, said plate being clamped in the lens frame to the rear thereof, a thin spring supported at one end by said plate and extending upwardly in front of the plate, a disc secured to the top end of the spring, said disc being colored on its front surface with a color contrasting to the color of the plate, in simulation of the iris of the human eye, said disc having a spot at its center of a color contrasting with the color of the disc in simulation of the pupil of the human eye.

2. A pair of toy spectacles comprising a frame structure with lens frames at the ends thereof, templets hingedly connected to the ends of the frame structure, and lenses supported in the lens frames, said lenses each having its surface painted to simulate the eyelids of the human eye, the portion of the surface between the eyelids being transparent, and mechanism behind the transparent portions simulating human eyeballs, said mechanism behind each transparent portion including a plate colored white in simulation of the color of the human eyeball, said plate being clamped in the lens frame to the rear thereof, said plate having a peephole therein centrally thereof, a thin spring supported at the bottom end of said plate and extending upwardly in front of the plate, a thin disc secured to the top end of the spring, said disc being colored on its front surface with a color contrasting to the color of the plate in simulation of the iris of the human eye, said disc having a spot at its center of a color contrasting with the color of the disc in simulation of the pupil of the human eye, said disc having a slot in alignment with the peephole in the plate.

3. A pair of toy spectacles as defined in claim 1, wherein a weight is secured to the disc for increasing the sensitivity of the spring.

4. A pair of toy spectacles as defined in claim 1, wherein a balancing device is secured across the spring adjacent its juncture with the supporting plate.

5. A pair of toy spectacles as defined in claim 1, wherein a weight is secured to the disc for increasing the sensitivity of the spring and a balancing device is secured across the spring adjacent its juncture with the supporting plate.

6. A pair of toy spectacles comprising a frame structure with lens frames at the ends thereof, templets hingedly connected to the ends of the frame structure, and lenses supported in the lens frames, said lenses each having its surface painted to simulate the eyelids of the human eye, the portion of the surface between the eyelids being transparent, and mechanism behind the transparent portions simulating human eyelids, said mechanism behind each transparent portion including a plate colored white in simulation of the color of the human eyeball, said plate being clamped in the lens frame to the rear thereof, said plate having a slot in its periphery at its bottom end, a thin disc secured to the rear surface of said plate, a lug on the periphery of said disc extending through the slot in the plate to the front of said plate, a thin spring having one end secured to the protruding end of the lug, said spring extending upwardly in front of the plate, a disc secured to the top end of the spring, said latter disc being colored on its front surface with a color contrasting to the color of the plate in simulation of the iris of the human eye, said latter disc having a spot at its center of a color contrasting with the color of the disc in simulation of the pupil of the human eye.

References Cited in the file of this patent
UNITED STATES PATENTS

| | | |
|---|---|---|
| 1,249,810 | Olson | Dec. 11, 1917 |
| 1,526,211 | Hirschman | Feb. 10, 1925 |
| 1,943,736 | Marcus | Jan. 16, 1934 |
| 2,832,593 | Anderson | Apr. 29, 1958 |